United States Patent
Qin et al.

(10) Patent No.: US 12,504,480 B2
(45) Date of Patent: Dec. 23, 2025

(54) DURABILITY TEST METHOD AND SYSTEM AND DATA TABLE GENERATION METHOD FOR BATTERY PULSED HEATING

(71) Applicant: SHELL OIL COMPANY, Houston, TX (US)

(72) Inventors: Yudi Qin, Beijing (CN); Languang Lu, Beijing (CN); Yalun Li, Beijing (CN); Minggao Ouyang, Beijing (CN); Jianqiu Li, Beijing (CN)

(73) Assignee: SHELL USA, INC., Houston, TX (US)

( * ) Notice: Subject to any disclaimer, the term of this patent is extended or adjusted under 35 U.S.C. 154(b) by 383 days.

(21) Appl. No.: 17/631,239

(22) PCT Filed: Aug. 27, 2020

(86) PCT No.: PCT/EP2020/073981
§ 371 (c)(1),
(2) Date: Jan. 28, 2022

(87) PCT Pub. No.: WO2021/037984
PCT Pub. Date: Mar. 4, 2021

(65) Prior Publication Data
US 2022/0357407 A1    Nov. 10, 2022

(30) Foreign Application Priority Data
Aug. 29, 2019  (CN) .......................... 201910806603.3

(51) Int. Cl.
*G01R 31/392* (2019.01)
*G01R 31/367* (2019.01)
*H01M 10/48* (2006.01)

(52) U.S. Cl.
CPC ......... *G01R 31/392* (2019.01); *G01R 31/367* (2019.01); *H01M 10/48* (2013.01)

(58) Field of Classification Search
None
See application file for complete search history.

(56) References Cited

U.S. PATENT DOCUMENTS 11,372,051 B2   6/2022   Arima et al.
11,422,190 B2   8/2022   Hara et al.
(Continued)

FOREIGN PATENT DOCUMENTS

JP   2011233244 A       11/2011
JP   2013164297 A   *   8/2013
(Continued)

OTHER PUBLICATIONS

International Search Report and Written Opinion received for PCT Patent Application No. PCT/EP2020/073981, mailed on Dec. 4, 2020, 12 pages.
(Continued)

*Primary Examiner* — Matthew G Marini
(74) *Attorney, Agent, or Firm* — SHELL USA, INC.

(57) ABSTRACT

A lithium-ion battery to be tested is put into a temperature chamber at a first temperature value and subjected to pulsed heating until the pulsed heating time reaches the preset pulse duration. The chamber temperature is adjusted to a second value and a capacity degradation value of the battery is obtained, so as to obtain durability of the battery. Before testing of the capacity degradation value of the battery, continuous pulsed heating is conducted. After the battery is heated for a period of time, the temperature elevation and heat dissipation of the battery will reach stable values and the temperature will no longer rise. Such pulsed heating does not require a long period of standing at low temperature. Therefore, a large amount of test time can be saved, the test
(Continued)

period shortened, and the influence of battery temperature on battery durability can be verified through a large number of experiments.

10 Claims, 3 Drawing Sheets

(56) References Cited

U.S. PATENT DOCUMENTS

| | | |
|---|---|---|
| 2003/0184307 A1 | 10/2003 | Kozlowski et al. |
| 2012/0025773 A1 | 2/2012 | Wang et al. |
| 2013/0090900 A1* | 4/2013 | Gering .................. G01R 31/392 703/2 |
| 2014/0285135 A1 | 9/2014 | Ji et al. |

FOREIGN PATENT DOCUMENTS

| | | |
|---|---|---|
| JP | 2015070753 A | 4/2015 |
| JP | 2016045149 A | 4/2016 |

OTHER PUBLICATIONS

Xuebing et al., "A Comparative Study of Commercial Lithium Ion Battery Cycle Life in Electric Vehicle: Capacity Loss Estimation", Journal of Power Sources, vol. 268, Jun. 26, 2014, pp. 658-669, XP029010624.

Dongxiang et al., "Durability Comparison of Four Different Types of High-power Batteries in HEV and their Degradation Mechanism Analysis", Applied Energy, vol. 179, Jul. 26, 2016, pp. 1123-1130, XP029701530.

Office Action Received for Japanese Application No. 2022-509665, Mailed on Jul. 30, 2024, 06 Pages (03 Pages of English Translation and 03 Pages of Official Copy).

* cited by examiner

DURABILITY TEST METHOD AND SYSTEM AND DATA TABLE GENERATION METHOD FOR BATTERY PULSED HEATING

CROSS REFERENCE TO RELATED APPLICATIONS

This is a National stage application of International application No. PCT/EP2020/073981, filed Aug. 27, 2020, which claims priority of CN application No. 201910806603.3, filed 29 Aug. 2019 which is incorporated herein by reference in its entirety.

TECHNICAL FIELD

The present application relates to the technical field of battery management, particularly to a durability test method and system and a data table generation method for battery pulsed heating.

BACKGROUND ART

With the development of the automobile industry, China has grown into the largest country in terms of automobile growth. Under the trend of global warming and rising oil prices in the world, new energy vehicles have become the focus of research and development in the current automobile industry. Today, electric vehicles are the development focus of new energy vehicles, while the performance of electric vehicles will closely depend on the performance of lithium-ion power batteries. The durability of lithium-ion power batteries is an important indicator to judge the performance of the entire electric vehicle. The durability of lithium-ion power batteries is generally judged by the number of charge and discharge cycles required when the capacity of the battery is degraded to a certain percentage of the initial capacity.

The traditional power battery durability test detects the degradation of the battery capacity after charging and discharging the battery for multiple times, thereby reflecting the durability of the battery. However, the traditional power battery durability test has the problem that a long period of standing at low temperature is required between two charge and discharge processes, causing the problem of a long test period.

SUMMARY OF THE INVENTION

To address the problem of the traditional power battery durability test that a long period of standing at low temperature is required between two charge and discharge processes, causing the problem of a long test period, it is necessary to provide a durability test method and system and a data table generation method for battery pulsed heating.

A durability test method for battery pulsed heating, comprising:
providing a battery to be tested, putting the battery to be tested into a temperature chamber, and setting the temperature of the temperature chamber at a first temperature value;
performing pulsed heating of the battery to be tested under first pulse parameters until the pulsed heating time reaches the preset pulse duration, and obtaining stable temperature of the battery to be tested;
adjusting the temperature of the temperature chamber to a second temperature value, and obtaining the capacity degradation value of the battery to be tested at the second temperature value; and
according to the preset pulse duration and the capacity degradation value, obtaining the durability of the battery to be tested at the stable temperature after pulsed heating under the first pulse parameters.

In one of the embodiments, the step of performing pulsed heating of the battery to be tested under first pulse parameters until the pulsed heating time reaches the preset pulse duration, and obtaining stable temperature of the battery to be tested comprises:
charging with a first amplitude value in constant-current mode for a second time value;
discharging with the first amplitude value in constant-current mode for the second time value, wherein the sum of two second time values is a pulse period value, and the first pulse parameters include the first amplitude value and the pulse period value;
repeating the charging and discharging steps and stopping pulsed heating when the pulsed heating time reaches the preset pulse duration.

In one of the embodiments, the step of according to the preset pulse duration and the capacity degradation value, obtaining the durability of the battery to be tested at the stable temperature after pulsed heating under the first pulse parameters comprises:
Obtaining pulsed heating times according to the preset pulse duration and the pulse period value; and
According to the pulsed heating times and the capacity degradation value, obtaining the durability of the battery to be tested after pulsed heating under the first pulse parameters.

In one of the embodiments, the step of adjusting the temperature of the temperature chamber to a second temperature value, and obtaining the capacity degradation value of the battery to be tested at the second temperature value comprises:
adjusting the temperature of the temperature chamber to a second temperature value, and letting it stand for a first time value;
discharging with the second amplitude value in constant-current mode to the lower limit cut-off voltage of the battery to be tested, and letting it stand for a fourth time value;
charging with the second amplitude value in constant-current mode to the upper limit cut-off voltage of the battery to be test, then charging in constant-voltage mode until the current of the battery to be tested is reduced to a third amplitude value, letting it stand for the fourth time value, and obtaining the current battery discharge capacity value of the battery to be tested; and
repeating steps discharging and charging for the preset times, and obtaining the average battery discharge capacity value, so as to obtain the capacity degradation value of the battery to be tested.

A data table generation method, used to reflect the durability of the battery under different pulsed heating parameters, and comprising:
Providing a plurality of groups of batteries to be tested, with each group having a plurality of batteries;
Putting each battery to be tested in each group into a temperature chamber, performing pulsed heating of the battery to be tested in each group until the pulsed heating time reaches the preset pulse duration, and obtaining stable temperature of the battery to be tested;

Adjusting the temperature of each temperature chamber to a second temperature value, and obtaining the capacity degradation value of each battery to be tested at the second temperature value; and Generating the data table according to the corresponding pulsed heating parameters of each battery to be tested and the capacity degradation value of the battery to be tested;

Here, the corresponding pulsed heating parameters of the batteries to be tested in the same group are the same, while the corresponding pulsed heating parameters of the batteries to be tested in different groups are different and the pulsed heating parameters include stable temperature of the battery, state of charge of the battery, pulse period, pulse amplitude value and pulse duration.

A durability test system for battery pulsed heating, comprising:

A pulsed heating device, electrically connected to the battery to be tested, used for performing pulsed heating of the battery to be tested under first pulse parameters until the pulsed heating time reaches the preset pulse duration, and obtaining stable temperature;

A capacity degradation acquisition device, electrically connected to the battery to be tested, and used for obtaining the capacity degradation value of the battery to be tested at the second temperature value after the pulsed heating is stopped when the pulsed heating time reaches the preset pulse duration; and A processing device, electrically connected to the pulsed heating device and the capacity degradation acquisition device respectively, used for obtaining the durability of the battery to be tested at the stable temperature after pulsed heating under the first pulse parameters according to the preset pulse duration and the capacity degradation value.

In one of the embodiments, the pulsed heating device comprises:

A temperature chamber, used for placing the battery to be tested and providing stable temperature conditions for the battery to be tested; and A pulsed heating element, electrically connected to the battery to be tested, and used for providing charge-discharge pulsed heating cycles under the first pulse parameters until the pulsed heating time reaches the preset pulse duration.

In one of the embodiments, the pulsed heating element comprises:

A charging unit, electrically connected to the battery to be tested, and used for charging the battery to be tested with a first amplitude value for a second time value; and A discharging unit, electrically connected to the battery to be tested, and used for discharging the battery to be tested with the first amplitude value in constant-current mode for the second time value, wherein the sum of two second time values is a pulse period value of the pulsed heating.

In one of the embodiments, the processing device comprises:

A first acquisition module, electrically connected to the charging unit and the discharging unit respectively, and used for obtaining pulsed heating times according to the preset pulse duration and the period value; and A first data processing module, electrically connected to the first acquisition module, and used for obtaining the durability of the battery to be tested after pulsed heating under the first pulse parameters according to the pulsed heating times and the capacity degradation value.

In one of the embodiments, the capacity degradation acquisition device comprises:

A first test module, electrically connected to the battery to be tested, used for charging with a second amplitude value in constant-current mode to the upper limit cut-off voltage, then charging in constant-voltage mode until the current of the battery is reduced to a third amplitude value, and letting it stand for a fourth time value, and further used for discharging with the second amplitude value in constant-current mode to the lower limit cut-off voltage, and letting it stand for the fourth time value;

A second data processing module, electrically connected to the first test module, and used for obtaining the battery capacity value of the battery to be tested for multiple times, so as to obtain the capacity degradation value of the battery to be tested.

In one of the embodiments, the second data processing module comprises:

A second acquisition unit, electrically connected to the first test module, and used for obtaining the battery discharge capacity value of the battery to be tested for multiple times, and calculating the average battery discharge capacity value;

A second processing unit, electrically connected to the second acquisition unit, and used for obtaining the capacity degradation value of the battery to be tested according to the battery discharge capacity value and the preset battery discharge capacity value of the battery to be tested.

The foregoing durability test method for battery pulsed heating comprises putting the battery to be tested into a temperature chamber, and setting the temperature of the temperature chamber at a first temperature value; performing pulsed heating of the lithium-ion battery under first pulse parameters until the pulsed heating time reaches the preset duration; adjusting the temperature of the temperature chamber to a second temperature value, and obtaining the capacity degradation value of the battery to be tested at the second temperature value; and according to the preset pulse duration and the capacity degradation value, obtaining the durability of the battery to be tested after pulsed heating under the first pulse parameters. In the durability test method for battery pulsed heating provided by the present application, before testing of the capacity degradation value of the battery to be tested, continuous pulsed heating is conducted. After the battery is heated for a period of time, the temperature elevation and heat dissipation of the battery will reach stable values and the temperature will no longer rise. Such pulsed heating does not require a long period of standing at low temperature. Therefore, a large amount of test time can be saved, the test period is shortened, and the influence of battery temperature on battery durability can be verified through a large number of experiments.

DESCRIPTION OF REFERENCE SIGNS OF
MAIN ELEMENTS IN THE ACCOMPANYING
DRAWINGS

Durability test system for battery pulsed heating 10
Pulsed heating device 100

Capacity degradation acquisition device 200
Processing device 300

DETAILED DESCRIPTION

In order to make the foregoing objectives, features and advantages of the present application more evident and easier to understand, specific implementation manners of the present application are described in detail by referring to the accompanying drawings below. In the following description, many details are provided to fully understand the present application. However, the present application can be implemented in many ways that are different from this description, and those skilled in the art can make similar modifications without departing from the spirit of the present application, so the present application is not limited to the specific implementation disclosed below.

It should be noted that when an element is said to be "arranged on" another element, it can be directly on another element or there can be a middle element. When an element is considered to be "connected" to another element, it can be directly connected to another element or there can be a middle element at the same time.

Unless otherwise defined, all technical and scientific terms used herein have the same meanings as commonly understood by those skilled in the technical field to which the present application pertains. The terms used in the specification of the present application herein are intended to describe specific embodiments only and not to limit the present application. The term "and/or" used herein includes any of one or more related listed items and all combinations thereof.

Figure 1:
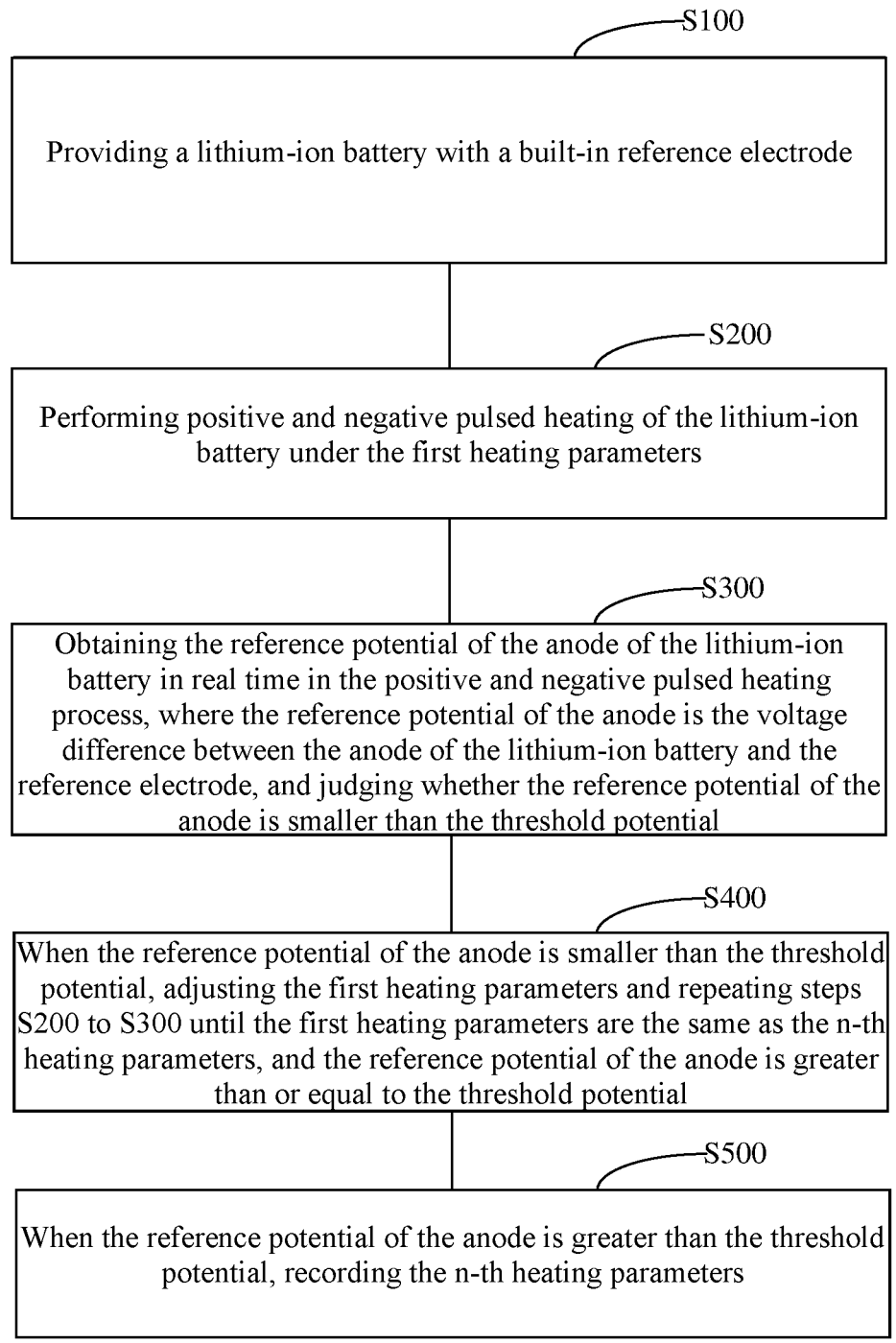
FIG. 1 is a flow diagram of a durability test method for battery pulsed heating provided by an embodiment of the present application.

Please refer to FIG. 1. The present application provides a durability test method for battery pulsed heating. The method comprises:

S10, providing a battery to be tested, putting the battery to be tested into a temperature chamber, and setting the temperature of the temperature chamber at a first temperature value. The battery to be tested can be a lithium-ion battery and may be in a plurality of forms such as soft package, square and cylinder. The temperature chamber can be a high and low temperature explosion-proof temperature chamber. In an optional embodiment, the temperature chamber is a Bell high and low temperature explosion-proof temperature chamber. The Bell high and low temperature explosion-proof temperature chamber can provide a charge and discharge environment of temperature for batteries in the chamber. The inside of the temperature chamber may have a temperature sensor and a cold air outlet. The temperature chamber can also adjust the humidity inside the chamber. The first temperature value can be −20° C., −10° C., 10° C., 30° C., etc.

S20, performing pulsed heating of the battery to be tested under first pulse parameters until the pulsed heating time reaches the preset pulse duration, and obtaining stable temperature of the battery to be tested. The first pulse parameters include the pulse period and the pulse amplitude value. The preset pulse duration can be 100 hours. The stable temperature is the temperature when the temperature elevation and heat dissipation of the battery are stable.

S30, adjusting the temperature of the temperature chamber to a second temperature value, and obtaining the capacity degradation value of the battery to be tested at a second temperature value. The second temperature value can be room temperature. The capacity degradation value is the ratio between the current actual discharge capacity and the initial discharge capacity.

S40, according to the preset pulse duration and the capacity degradation value, obtaining the durability of the battery to be tested at the stable temperature after pulsed heating under the first pulse parameters. The durability reflects the capacity degradation value of the battery at a first temperature value after the preset period of time of pulsed heating under the first pulse parameters. In an optional embodiment, the step of according to the preset pulse duration and the capacity degradation value, obtaining the durability of the battery to be tested after pulsed heating under the first pulse parameters can be obtaining pulsed heating times according to the preset pulse duration and the pulse period value; and according to the pulsed heating times and the capacity degradation value, obtaining the durability of the battery to be tested after pulsed heating under the first pulse parameters.

In an optional embodiment, after the step of according to a preset pulse duration and the capacity degradation value, obtaining the durability of the battery to be tested after pulsed heating under the first pulse parameters, steps S10 to S40 can be repeated to obtain the durability of the battery to be tested after pulsed heating under the first pulse parameters for two preset pulse durations.

In this embodiment, in the foregoing durability test method for battery pulsed heating, before testing of the capacity degradation value of the battery to be tested, continuous pulsed heating is conducted. After the battery is heated for a period of time, the temperature elevation and heat dissipation of the battery will reach stable values and the temperature will no longer rise. Such pulsed heating does not require a long period of standing at low temperature. Therefore, a large amount of test time can be saved, the test period is shortened, and the influence of battery temperature on battery durability can be verified through a large number of experiments.

In one of the embodiments, the step S20 of performing pulsed heating of the battery to be tested under first pulse parameters until the pulsed heating time reaches the preset pulse duration, and obtaining stable temperature of the battery to be tested can be charging with a first amplitude value in constant-current mode for a second time value; discharging with the first amplitude value in constant-current mode for the second time value, wherein the sum of two second time values is a pulse period value, and the first pulse parameters include the first amplitude value and the pulse period value; repeating the pulse charging and discharging step for multiple times and stopping the pulsed heating when the pulsed heating time reaches the preset pulse duration. After the temperature of the temperature chamber is set at a temperature value, the battery is subjected to continuous pulse action under a parameter. In the end, the temperature elevation and heat dissipation of the battery will reach stable values and the temperature will no longer rise significantly. The battery is heated continuously in this state until the pulsed heating time reaches the preset pulse duration. Such pulsed heating method saves a large amount of test time and shortens the test period. Please refer to Table 1, which show specific parameters and stable test temperature values of 10 tested batteries. The 10 batteries to be tested are all in 50% SOC, and are provided with different pulsed parameters and environmental temperature.

TABLE 1

Parameters and Stable Test Temperature Of 10 Batteries

| Battery No. | Period/s | Positive and negative pulse amplitude value | Stable temperature/° C. |
|---|---|---|---|
| A | 4 | 2 C:2 C = 100 A:100 A | −1.2 |
| B | 20 | 2 C:2 C = 100 A:100 A | −5.1 |
| C | 40 | 2 C:2 C = 100 A:100 A | 14.6 |
| D | 1.6 | 4 C:4 C = 200 A:200 A | 18 |
| E | 8 | 4 C:4 C = 200 A:200 A | 32 |
| F | 4 | 2 C:2 C = 100 A:100 A | −14.4 |
| G | 20 | 2 C:2 C = 100 A:100 A | −17.4 |
| H | 40 | 2 C:2 C = 100 A:100 A | 0.8 |
| I | 4 | 4 C:4 C = 200 A:200 A | −2.6 |
| J | 8 | 4 C:4 C = 200 A:200 A | 15 |

Figure 2:
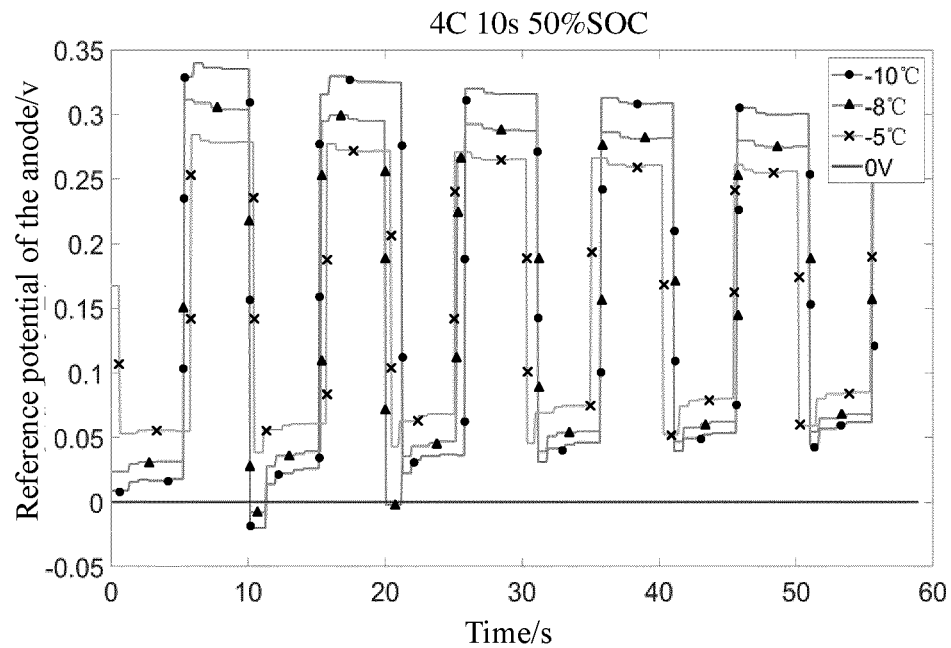
FIG. 2 is a result diagram of a durability test method for battery pulsed heating provided by an embodiment of the present application.

After the foregoing 10 tested batteries are continuously acted upon for a certain period of time, the pulse is withdrawn, and the capacity degradation values of the tested batteries are measured respectively. The test results are as shown in FIG. 2. Under the condition of temporarily not considering the battery temperature, the capacity is degraded faster under the action of a large-period, high-amplitude pulse. The value of degradation is analyzed. The battery with the largest percentage of capacity degradation is battery F. Its capacity is degraded by 1% under the action of a pulse with an amplitude value of 4 C and a period of 8 s. The action of pulse current needs to last for about 130 hours without stop. In 500 h, the capacity is degraded only by 2.5%.

Under the same pulse parameters, the lower the temperature is, the faster the life is degraded, but different batteries with the same parameters and different temperature do not have much difference in the degradation. In contrast, the impact of amplitude and period on the life is more obvious.

In one of the embodiments, the step S30 of adjusting the temperature of the temperature chamber to a second temperature value, and obtaining the capacity degradation value of the battery to be tested at the second temperature value comprises:

S310, adjusting the temperature of the temperature chamber to a second temperature value, and letting it stand for a first time value; S320, discharging with the second amplitude value in constant-current mode to the lower limit cut-off voltage, and letting it stand for a fourth time value; S330, charging with the second amplitude value in constant-current mode to the upper limit cut-off voltage of the battery to be test, then charging in constant-voltage mode until the current of the battery to be tested is reduced to a third amplitude value, letting it stand for the fourth time value, and obtaining the current battery discharge capacity value of the battery to be tested; and S340, repeating steps S320 to S330 for the preset times, and obtaining the average battery discharge capacity value, so as to obtain the capacity degradation value of the battery to be tested.

In an optional embodiment, in order to obtain the current battery discharge capacity value, the battery can be put into a temperature chamber after pulsed heating is stopped, and the temperature of the temperature chamber is adjusted to 25° C. After sufficient standing, the battery is discharged in ⅓ C constant-current mode to the lower limit cut-off voltage, and then stands for 3 hours. Then the battery is discharged in ⅓ C constant-current mode to the upper limit cut-off voltage, then is charged in constant-voltage mode until the current is reduced to 1/20 C, and stands for 3 hours. The discharge and charge process is repeated for three times. The average of the capacity test data obtained in three tests is used as the current actual discharge capacity of the battery. The initial capacity of the battery can be obtained by the foregoing method before pulsed heating, so as to obtain the capacity degradation value from the ratio between the current actual discharge capacity and initial discharge capacity.

One embodiment of the present application provides a data table generation method, which is used to reflect the durability of the battery under different pulsed heating parameters. The data table generation method comprises:

Providing a plurality of groups of batteries to be tested, with each group having a plurality of batteries; putting each battery to be tested in each group into a temperature chamber, performing pulsed heating of the battery to be tested in each group until the pulsed heating time reaches the preset pulse duration, and obtaining stable temperature of the battery to be tested; adjusting the temperature of each temperature chamber to a second temperature value, and obtaining the capacity degradation value of each battery to be tested at the second temperature value; and generating the data table according to the corresponding pulsed heating parameters of each battery to be tested and the capacity degradation value of each battery to be tested.

Here, the corresponding pulsed heating parameters of the batteries to be tested in the same group are the same, while the corresponding pulsed heating parameters of the batteries to be tested in different groups are different and the pulsed heating parameters include stable temperature of the battery, state of charge of the battery, pulse period, pulse amplitude value and pulse duration.

Figure 3:
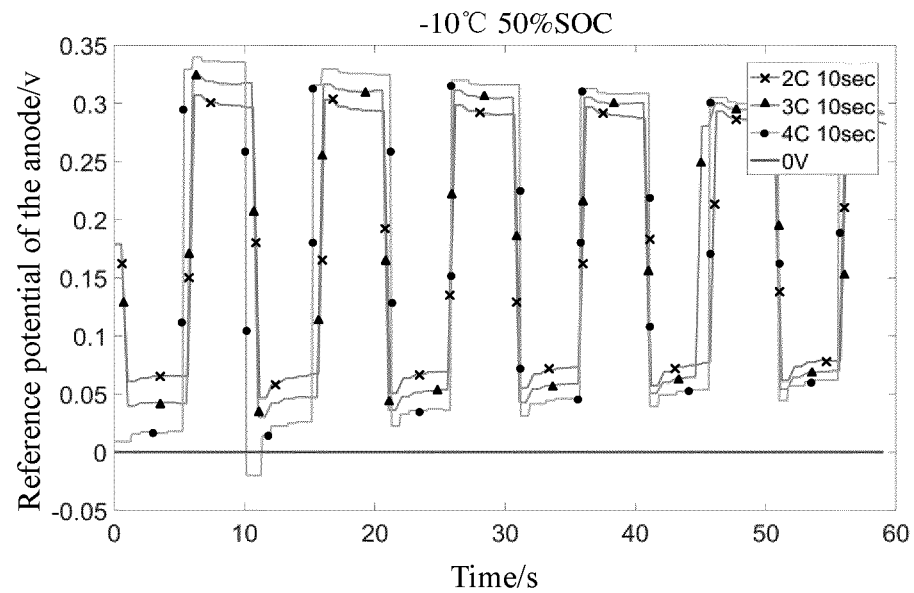
FIG. 3 is a structural connection diagram of a durability test system for battery pulsed heating provided by an embodiment of the present application.
Figure 4:
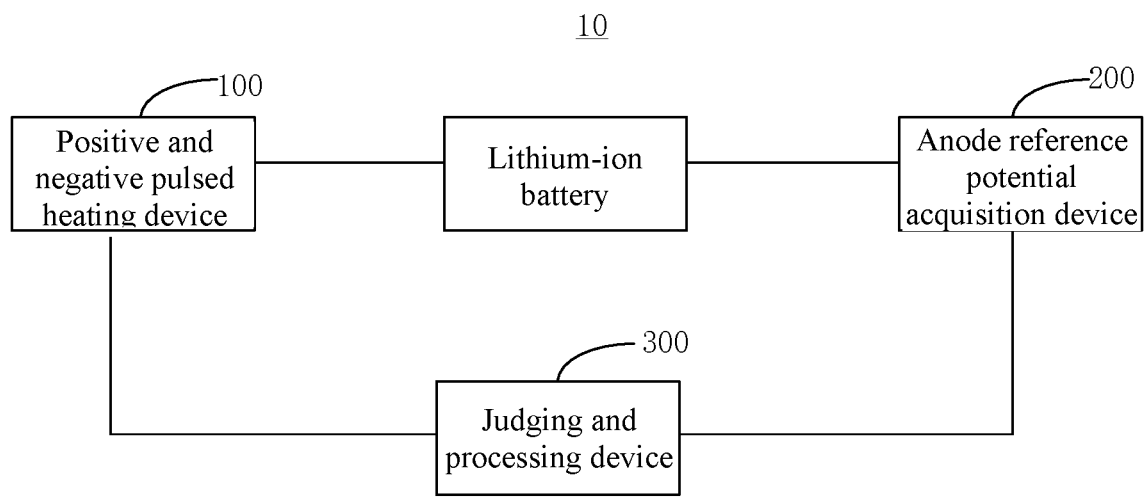
FIG. 4 is a structural connection diagram of a durability test system for battery pulsed heating provided by an embodiment of the present application.

In this embodiment, multiple groups of tests were conducted by the foregoing durability test method, for the batteries of the same model under different pulse parameters and different temperature. In the end, a durability scatter plot with at least six dimensions (i.e. data table) can be established. The six variables include five independent variables and one dependent variable. The five independent variables are battery temperature, state of charge of the battery, pulse period, pulse amplitude value and pulse duration. The dependent variable is capacity degradation value. The data table can be used to analyze the sensitivity of each factor, and by combining with the actual needs, and weighing the pulsed heating rate and the foregoing durability results, joint optimization can be conducted to complete the formulation of a pulse heating solution.

refer to FIG. 3. One embodiment of the present application provides a durability test system 10 for battery pulsed heating. The durability test system 10 for battery pulsed heating comprises a pulsed heating device 100, a capacity degradation acquisition device 200 and a processing device 300.

The pulsed heating device 100 is electrically connected to the battery to be tested. The pulsed heating device 100 is used for performing pulsed heating of the battery to be tested under first pulse parameters until the pulsed heating time reaches the preset pulse duration, and obtaining stable temperature of the battery to be tested. The capacity degradation acquisition device 200 is electrically connected to the battery to be tested. The capacity degradation acquisition device 200 is used for obtaining the capacity degradation value of the battery to be tested at the second temperature value after pulsed heating is stopped when the pulsed heating time reaches the preset pulse duration. The processing device 300 is electrically connected to the pulsed heating device 100 and the capacity degradation acquisition device 200 respectively. The processing device 300 is used for obtaining the durability of the battery to be tested at the stable temperature after pulsed heating under the first pulse parameters according to the preset pulse duration and the capacity degradation value. The pulsed heating device may comprise a charger that can provide positive and negative pulses. The capacity degradation acquisition device 200 may comprise a current flow sensor. The processing device 300 can be a microprocessor, single chip microcomputer (SCM), etc.

In one of the embodiments, the pulsed heating device 100 comprises a temperature chamber 110 and a pulsed heating element 120.

The temperature chamber 110 is used for placing the battery to be tested and providing stable temperature conditions for the battery to be tested. The pulsed heating element 120 is electrically connected to the battery to be tested, and used for providing charge-discharge pulsed heating cycles under the first pulse parameters until the pulsed heating time reaches the preset pulse duration. The temperature chamber is a Bell high and low temperature explosion-proof temperature chamber. The Bell high and low temperature explosion-proof temperature chamber can provide a charge and discharge environment of temperature for batteries in the chamber. The inside of the temperature chamber may have a temperature sensor and a cold air outlet. The temperature chamber can also adjust the humidity inside the chamber. The first temperature value can be −20° C., −10° C., 10° C., 30° C., etc.

The pulsed heating element 120 comprises a charging unit 121 and a discharging unit 122. The charging unit 121 is electrically connected to the battery to be tested, and used for charging the battery to be tested with a first amplitude value for a second time value. The discharging unit 122 is electrically connected to the battery to be tested, and used for discharging the battery to be tested with the first amplitude value in constant-current mode for the second time value, wherein the sum of two second time values is a pulse period value of the pulsed heating.

The processing device 300 comprises a first acquisition module 310 and a first data processing module 320. The first acquisition module 310 is electrically connected to the charging unit 121 and the discharging unit 122, respectively, and used for obtaining pulsed heating times according to the preset pulse duration and the period value. The first data processing module 320 is electrically connected to the first acquisition module 310 and used for obtaining the durability of the battery to be tested after pulsed heating under the first pulse parameters according to the pulsed heating times and the capacity degradation value.

The capacity degradation acquisition device 200 comprises a first test module 210 and a second data processing module 220. The first test module 210 is electrically connected to the battery to be tested, used for charging with the second amplitude value in constant-current mode to the upper limit cut-off voltage, then charging in constant-voltage mode until the current of the battery is reduced to a third amplitude value, and letting it stand for a fourth time value, and further used for discharging with the second amplitude value in constant-current mode to the lower limit cut-off voltage, and letting it stand for the fourth time value. The second data processing module 220 is electrically connected to the first test module 210, and used for obtaining the battery capacity value of the battery to be tested for multiple times, so as to obtain the capacity degradation value of the battery to be tested.

The second data processing module 220 comprises a second acquisition unit 221 and a second processing unit 222. The second acquisition unit 221 is electrically connected to the first test module 210, and used for obtaining the battery discharge capacity value of the battery to be tested for multiple times, and calculating the average battery discharge capacity value. The second processing unit 222 is electrically connected to the second acquisition unit 221, and used for obtaining the capacity degradation value of the battery to be tested according to the battery discharge capacity value and the preset battery discharge capacity value of the battery to be tested.

In this embodiment, in the foregoing durability test system 10 for battery pulsed heating, before the capacity degradation acquisition device 200 tests the capacity degradation value of the battery to be tested, continuous pulsed heating is conducted through the pulsed heating device 100. After the battery is heated for a period of time, the temperature elevation and heat dissipation of the battery will reach stable values and the temperature will no longer rise. Such pulsed heating does not require a long period of standing at low temperature. Therefore, a large amount of test time can be saved, the test period is shortened, and the influence of battery temperature on battery durability can be verified through a large number of experiments.

The technical features of the foregoing embodiments can be freely combined. In order to make the description concise, all possible combinations of the technical features in the foregoing embodiments are not described. However, as long as there is no contradiction in the combinations of these technical features, they should be considered falling in the scope of this specification.

The foregoing embodiments only represent a few implementation manners of the present application. Their descriptions are concrete and detailed, but they shall not be therefore understood as limitations to the scope of the patent under application. It should be noted that for those of ordinary skill in the art, various changes and modifications may be made to the embodiments without departing from the conception of the present application. All these fall in the scope of protection of the present application. Therefore, the scope of protection of the patent under the present application shall be subject to the appended claims.

The invention claimed is:

1. A temperature chamber for receiving and testing a battery comprising:
   a pulsed heating device comprising a charger and a discharger, electrically connected to the battery, that performs pulsed heating of the battery under first pulse parameters until a pulsed heating time reaches a preset pulse duration and the battery reaches a stable temperature;
   a capacity degradation acquisition device comprising a current flow sensor, wherein the current flow sensor is electrically connected to the battery and used to take battery parameter measurements during testing; and
   a processing device comprising a microprocessor and electrically connected to the pulsed heating device and the capacity degradation acquisition device wherein the microprocessor is configured to:
      determine a capacity degradation value of the battery by calculating a ratio between an actual discharge capacity measurement and an initial discharge capacity measurement based on the battery parameter measurements at a second temperature after the pulsed heating is stopped, and
      determine a durability of the battery based on the battery parameter measurements and the capacity degradation value.

2. The temperature chamber according to claim 1, wherein the pulsed heating device comprises:
   a pulsed heating element, electrically connected to the battery, and used for providing charge-discharge pulsed heating cycles under the first pulse parameters until the pulsed heating time reaches the preset pulse duration.

3. The temperature chamber according to claim 2,
   wherein the charger charges the battery with a first amplitude value for a first time value; and
   wherein the discharger discharges the battery with the first amplitude value in constant-current mode for a second time value, wherein the sum of the first and second time values is a pulse period value of the pulsed heating.

4. The temperature chamber according to claim 3, wherein the processing device is further electrically connected to the charger and the discharger and configured to obtain the pulsed heating time according to the preset pulse duration and the pulsed period value; and
   configured to obtain the durability of the battery after pulsed heating under the first pulse parameters according to the pulsed heating time and the capacity degradation value.

5. The temperature chamber according to claim 3, wherein the capacity degradation acquisition device is further configured to:
   control the charger, via the processing device, to charge the battery with a second amplitude value in constant-current mode to an upper limit cut-off voltage, then charging in constant-voltage mode until a current of the battery is reduced to a third amplitude value, and letting it stand for a third time value;
   control the discharger, via the processing device, to discharge with the second amplitude value in constant-current mode to a lower limit cut-off voltage, and letting it stand for the third time value; and
   obtain, via the current flow sensor, a battery discharge capacity value of the battery multiple times, wherein in the capacity degradation value of the battery based on the multiple battery discharge capacity values.

6. The temperature chamber according to claim 5, wherein the capacity degradation acquisition device is further configured to:
   obtain, via the current flow sensor, the battery discharge capacity value of the battery to be tested for multiple times, and calculating an average battery discharge capacity value; and
   obtain, via the processing device, the capacity degradation value of the battery according to the battery discharge capacity value and a preset battery discharge capacity value of the battery to be tested.

7. A battery testing system for testing a battery, the system comprising:
   a temperature chamber having a temperature sensor that receives the battery and uses pulsed heating to maintain a first temperature until the battery reaches the first temperature for a first time period and using pulsed heating to reach a second temperature and to maintain the second temperature until the battery reaches the second temperature for a second time period;
   a current discharge measuring tool, including a control flow sensor, that measures a first discharge capacity of the battery at the first temperature after the first time period and measures a second discharge capacity of the battery at the second temperature after the second time period; and
   a processing device, including a microprocessor, that determines a capacity degradation value of the battery by calculating a ratio between the first discharge capacity and the second discharge capacity.

8. The system according to claim 7, further comprising:
   a charger that charges the battery with a first amplitude in a constant-current mode for a first time value; and a discharger that discharges the battery with the first amplitude for a second time value;
   wherein a sum of the first time value and the second time value is a pulse period, and pulse parameters include the first amplitude and the pulse period; and the charger and discharger repeat charging and discharging until a pulsed heating time reaches a preset pulse duration.

9. The system according to claim 8, wherein the discharger discharges using a second amplitude value in constant-current mode to a lower limit cut-off voltage of the battery, and the charger charges with the second amplitude value in constant-current mode to an upper limit cut-off voltage of the battery, then charging in constant-voltage mode until a current of the battery is reduced to a third amplitude value, and obtaining a current battery discharge capacity of the battery.

10. The system according to claim 9, wherein the charger and discharger repeat discharging and charging for the respective time values to determine an average battery discharge capacity so as to obtain the capacity degradation value of the battery.

* * * * *